United States Patent [19]
Reaves

[11] 3,766,678
[45] Oct. 23, 1973

[54] HARPOON-FLYING GAFF

[76] Inventor: Harry D. Reaves, 929 N. Patrick Henry Dr., Arlington, Va. 22205

[22] Filed: Oct. 4, 1971

[21] Appl. No.: 185,948

[52] U.S. Cl. .......................................... 43/6, 294/61
[51] Int. Cl. ............................................. A01k 81/04
[58] Field of Search .................... 43/6, 5, 4; 294/61, 294/126

[56] References Cited
UNITED STATES PATENTS

| 2,442,974 | 6/1948 | Frederiksen | 43/6 |
| 2,758,405 | 8/1956 | Hertel | 43/6 |
| 71,763 | 12/1867 | Kelley | 43/6 |
| 2,745,204 | 5/1956 | Myers | 43/6 |

Primary Examiner—Warner H. Camp
Attorney—John X. Phillips

[57] ABSTRACT

A pointed instrument, in the nature of a harpoon or gaff, is provided with a shank slidably fitted into one end of a tubular handle and detachably connected to a flexible element extending from the other end of the handle and adapted to have its extremity anchored whereby, when a sea creature is harpooned or gaffed and attempts to run, the flexible element can slide outwardly through the tubular handle to the limit of movement provided by the anchoring of the flexible element, whereupon such element may be pulled back through the tubular handle and the fish or other creature landed. The harpoon has a pivoted blade releasably held in fixed position relative to the shank, whereby when the fish is harpooned, a pull on one point of the harpoon blade will swing it to a position transverse to the shank for a firmer and in fact unbreakable hold on the fish so that it may be landed.

6 Claims, 9 Drawing Figures

Patented Oct. 23, 1973
3,766,678
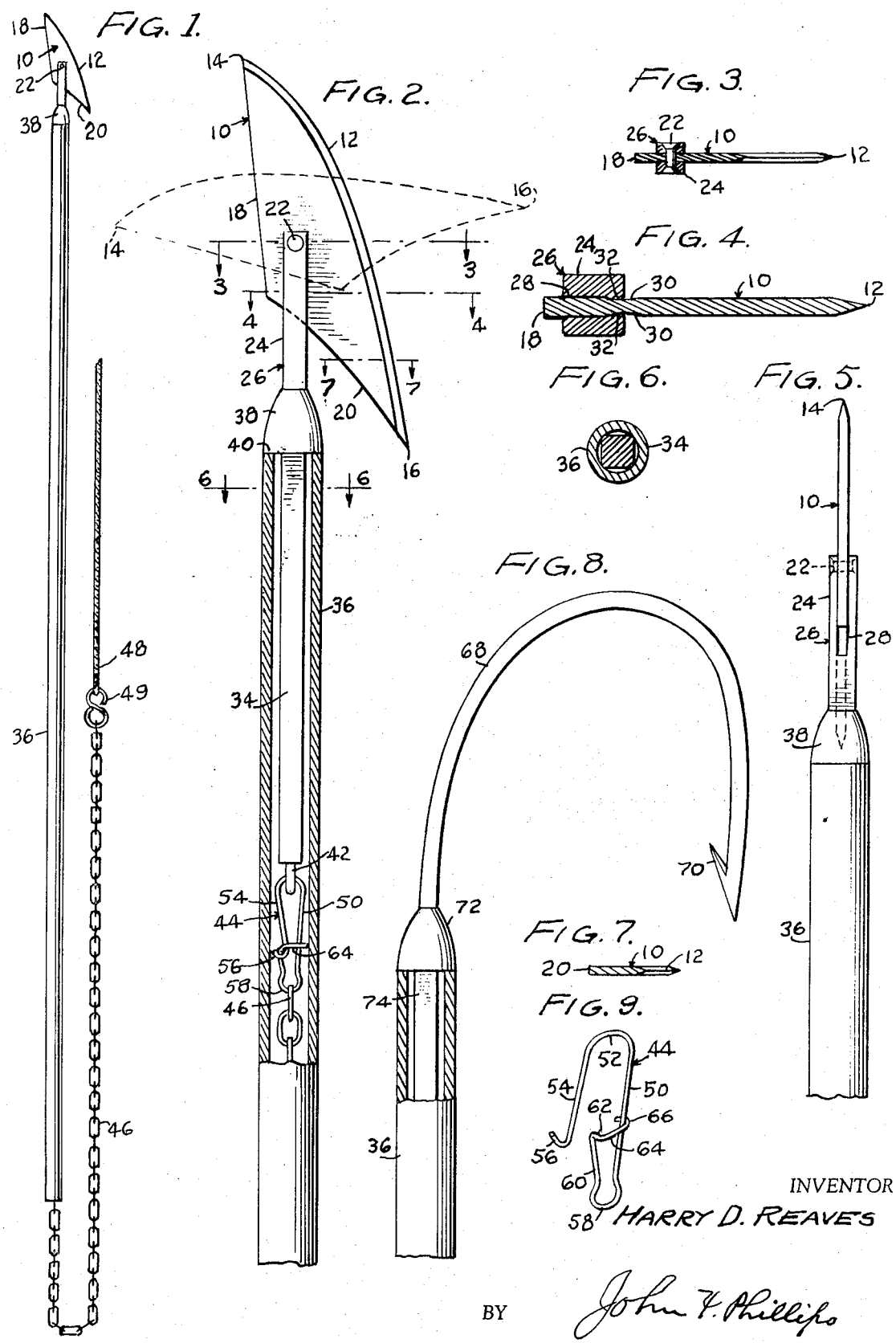

HARPOON-FLYING GAFF

THE PRIOR ART

It has been proposed to provide harpoons having pivoted blades but these devices are unsatisfactory. In some such devices, the blade is pivoted relatively freely and is easily displaced before entering the body of the fish. In others, the blade is locked by positive means which must be disconnected before the device is used, or employs a shear pin which may or may not shear off in operation. Moreover, such prior devices do not provide effective means whereby a harpoon and gaff are interchangeable.

BRIEF SUMMARY OF THE INVENTION

A flesh-penetrating element, either in the form of a harpoon blade or gaff hook, is provided with a straight projecting shank entering one end of a tubular handle open throughout its length. The inner end of this shank is connected to a releasable coupling which in turn is connected to a flexible element preferably in the form of a chain which extends through the other end of the handle and therebeyond. The chain may be of sufficient length to be made fast aboard ship or other fishing site, or a rope or other flexible element may be fixed at one end to the chain and have the other end made fast. The invention also contemplates the use of a gaff hook provided with the same shank as the harpoon blade and connected by the releasable coupling to the chain within the handle.

The harpoon blade is generally triangular and is pivoted to the shank, the upper end of which is bifurcated to receive the blade and the pivot pin therefor. One edge of the blade is sharpened throughout its length and terminates at its ends in sharp points, while the other two edges of the blade are blunt. The blade is provided with a shallow depression where it enters the bifurcated shank, and the latter is slightly upset to engage the indentations in the blade to tend to hold it in normal position.

When a pull is exerted on the handle after harpooning a fish, the chain may be pulled around the bottom of the handle and grasped together with the handle and the chain will act as a lock to prevent it from moving into the handle and to prevent the shank portion within the handle from sliding out. When this pull is exerted either directly to the handle or by virtue of the fish attempting to run, the harpoon blade will swing to a position substantially transverse to the shank, thus causing the upper point to extend transversely substantially to a position in transverse alignment with the normally lower point. Under such conditions, a broad engagement with the flesh of the fish will be provided and the blunt edges of the harpoon blade will engage in the flesh and positively prevent the releasing of the harpoon blade from the flesh. This pull, of course, releases the blade from the bifurcated end of the shank, breaking the hold of the shank on the shallow depressions in the blade. After the fish is landed, a sharp forward thrust on the handle will cause the blade to swing back to its normal position as described below, rendering it easier to remove the harpoon from the fish. When the gaff is employed, the chain may be swung against the free end of the handle and gripped with the handle whereby the chain acts as a lock to prevent the sliding of the shank from the handle, thus facilitating the applications of a pull on the handle to sink the gaff hook into the fish.

BRIEF DESCRIPTION OF THE DRAWING

FIG. 1 is a side elevation on a substantially reduced scale of the device used as a harpoon;

FIG. 2 is a similar view substantially enlarged showing a portion of the handle broken away and a portion shown in section;

FIG. 3 is a transverse section on line 3—3 of FIG. 2;

FIG. 4 is a similar view on an enlarged scale taken on line 4—4 of FIG. 2;

FIG. 5 is an enlarged scale elevation of the upper end of the device looking at the edge of the harpoon blade;

FIG. 6 is a section on line 6—6 of FIG. 2;

FIG. 7 is a section on line 7—7 of FIG. 2;

FIG. 8 is a side elevation of the upper end of the device showing a gaff hook in operative position on the handle; and FIG. 9 is a detailed perspective view of the coupling between the shank and the chain shown in unhooked or releasing position.

DETAILED DESCRIPTION

Referring to the drawing in which the device is illustrated as a harpoon in FIGS. 1 to 7, inclusive, the numeral 10 indicates as a whole a harpoon blade of generally triangular shape having a long, somewhat curved, sharp edge 12 terminating at upper and lower points 14 and 16. From the point 14, the blade extends downwardly in a straight line 18 and this edge of the blade is blunt, as shown in FIGS. 3 and 4. The third edge 20 of the blade may be slightly concaved, as shown in FIG. 2, and this edge is also blunt as shown in FIG. 7.

The blade is pivoted as at 22 to the upper end 24 of a shank indicated as a whole by the numeral 26. This end of the shank is bifurcated as at 28 (FIG. 5) to receive the blade 10. When the blade is in normal position, slight indentations 30 in opposite sides thereof (FIG. 4) are engaged by shallow projections 32 in the bifurcated end 24. These projections may be formed by slightly upsetting the metal of the shank. These projections and the indentations 30 have been exaggerated in FIG. 4 for the purpose of illustration. Otherwise, the blade 10 has a sliding fit in the upper end of the shank.

The lower end 34 of the shank 26 (FIG. 2) extends into the upper end of a tubular handle 36. The shank may be made of square bar structure (FIG. 6) and is freely slidable in the handle 36. The shank is provided with an enlargement 38, the lower extremity 40 of which forms a shoulder, normally engaging the adjacent end of the handle 36, as shown in FIG. 2.

The lower end of the shank portion 34 is provided with an eye 42 connected by a coupling indicated as a whole by the numeral 44 to the adjacent end of any suitable type of chain 46. The coupling will be further referred to below. As shown in FIG. 1, the chain extends through the bottom of the handle 36 and therebeyond and if desired, may be made relatively longer than is shown in FIG. 1 to be made fast at a suitable point for a reason which will become apparent. If desired, the chain may be extended only to the point shown in FIG. 1 and may have connected thereto a rope 48 or other flexible element having its other end suitably made fast. Preferably, the chain 46 is connected to the rope by a coupling 49 too large to enter the lower end of the handle.

The type of coupling as illustrated may be employed or any other suitable form of releasable coupling may be used if desired. The coupling is conventional as illustrated and is formed of relatively stiff strong resilient wire. This coupling is provided with a straight side 50, the upper end of which loops over as at 52 and then extends downwardly as at 54 to terminate in an outwardly extending hook 56. The lower end of the coupling portion 50 is looped as at 58 and then extends upwardly as at 60. The upper end of the portion 60 is bent forwardly as at 62 to form a shoulder beneath which the hook 56 engages as shown in FIG. 2. From the shoulder 62 the material of the coupling extends transversely as at 64 and terminates in a hook 66 engaging the coupling portion 50. By releasing the hook 56 from the shoulder 62, with the shank portion 34 pulled from the handle, this shank portion may be released to be replaced by an identical shank portion of a gaff hook described below.

In FIG. 8, the device has been illustrated as a flying gaff 68, the formation of which, per se, is conventional, the gaff hook terminating in barb 70. The other end of the gaff hook is provided with an enlargement 72 identical with the enlargement 38 and provided therebeneath with a shank 74 identical with the shank portion 34. The shank 74 of the gaff hook is adapted to be connected by a coupling 44 or other suitable coupling to the adjacent end of the chain 46.

OPERATION

When a fish is being pulled in, with the operator holding the handle, the fish may run to a limited extent and upon exerting a pull on the harpoon head, the pulling of the point 16 will cause the depressions 30 to be released from the shank 24, whereupon the blade 10 will turn to the dotted line position shown in FIG. 2. This movement causes the point 14 to penetrate the fish and give a broad hold on the fish through a distance between the points 14 and 16. The blunt edges 18 and 20 prevent the blade from cutting loose from the fish.

When the fish runs, of course, the chain will slide upwardly through the handle and the shank 34 will slide from the handle to the extent limited by the length of the chain 46, as determined by the coupling 49. This is preferred so as to prevent the rope from coming into contact with the handle and possibly being cut thereby. The turning of the blade to the dotted line position in FIG. 2 may occur upon the initial sudden lunging of the fish, or may not occur until movement of the flexible elements through the handle 36 has been limited.

The rope and chain will then be pulled back into the handle until the shoulder 40 engages the upper end of the handle. The fish then may be landed. To facilitate this operation, the chain will be doubled back upon the handle 36 and the handle and the portion of the chain lying thereagainst will be grasped by the operator, thus facilitating the landing of the fish. The ends of the links of the chain provide abutments engageable with the end of the handle to lock the chain against movement through the handle. A rope is unsatisfactory because of the lack of positive locking and because of wearing in repeated use. A cable is not satisfactory because of the lack of positive locking. The distance from the pivot 22 to the point 16 is greater than the distance from the pivot point to he point 14. Upon the exertion of a sudden thrust forwardly on the handle 36, the right side of the blade edge 12 will meet greater resistance than the lefthand edge as viewed in FIG. 2. Hence, the blade will swing back to its normal position shown in solid lines in FIG. 2. Ac-cordingly, the removal of the harpoon from the landed fish will be facilitated. In this connection it will be noted that when the blade 10 has been returned to normal position, it may be pushed completely through the fish. The elements of the device, including the handle and flexible elements, then may be easily drawn through the fish and thus removed.

The use of the gripping means at 32 (FIG. 4) is desirable but not essential and is frictional in nature. The elements merely have a snug fit at the point indicated and release the blade 10 for swinging movement about its pivot, this action being automatic. The sharp edge 12, starting from the point 14, curves downwardly, crossing the extended axis of the handle 36, and continuing to the point 16. This curve is smooth and continuous. On entering the sea creature, therefore, the edge 12 performs a smooth slicing action. The dull edges 18 and 20, opposite the slicing edge 12, prevent the harpoon blade from tearing or cutting through the body of the creature and becoming dislodged.

When it is desired to use the device as a flying gaff, the shank 26 will be pulled upwardly through the handle 36 to expose the coupling 44. The hook 56 is then released from the shoulder 62, as shown in FIG. 9, whereupon the eye 42 (FIG. 2) may be released from the coupling. The same eye on the lower end of the shank 74 (FIG. 8) will then be engaged with the coupling and the latter locked in closed position, whereupon the chain and shank 74 may be pulled downwardly into the handle.

In a gaffing a fish, the chain will be pulled upwardly adjacent the handle and grasped together with the handle, whereupon the gaff may be swung and hooked into the fish and the chain will lock the gaff relative to the handle until the barb 70 has fully penetrated the fish. The chain then may be dropped while the handle is held, and the fish may run to a limited extent until stopped by movement of the chain 46 and rope 48 to their limits of movement. These flexible elements then may be pulled to pull the fish in for landing, whereupon the chain and handle may be grasped together to land the fish on the boat.

It will be apparent that the device may be used from a boat in deep sea fishing or may be used at any other site, for example from the shore or on a pier.

Where the term "fish" has been employed, this word is intended to be used in its generic sense and it will be apparent that the device may be used for landing any sea creature including mammals.

I claim:

1. A fish landing device comprising an element having a fish-piercing point, a straight shank connected to said element and projecting therefrom, a tubular handle open therethrough and one end of which slidably receives said shank, and a flexible element connected at one end to the end of said shank within said handle, at least a portion of said flexible element at the end thereof connected to said shank projecting beyond the other end of said handle and provided with abutments whereby, when a pull is exerted upon said handle the portion of said flexible element at said other end of said handle may be doubled back on said handle and grasped therewith to engage one of said abutments with said other end of said handle to prevent pulling of said shank from said handle.

2. A device according to claim 1 wherein said pointed element is a harpoon blade having said point thereof remote from said shank to enter the fish, said harpoon blade having a point remote from said first-named point acting as a barb to engage the flesh of the fish after said harpoon blade has entered into the fish, said harpoon blade having a sharpened edge lying wholly outwardly of said shank and extending between said two named points and convexly smoothly curving from end-to-end to provide a continuous cutting edge.

3. A device according to claim 2 wherein said harpoon blade is substantially triangular, having two edges in addition to said sharpened edge, both of said two edges being blunt.

4. A device according to claim 2 wherein said harpoon blade is pivoted to said shank, said harpoon blade and said shank having interengaging portions tending frictionally to prevent swinging movement of said harpoon blade about its pivot, a pull on said second point releasing said interengaging portions from each other whereby said harpoon blade is adapted to swing about its pivot to a position with said points in a line substantially transverse to the length of said shank.

5. A device according to claim 4 wherein said first-named point is closer to said pivot than said second-named point.

6. A device according to claim 1 wherein said portion of said flexible element is a link chain connected at one end to said shank and extending substantially from the other end of said handle, whereby the portion of said chain projecting from said handle may be doubled back against said handle to be grasped therewith to exert a pull on the fish with a link of said chain engaging said other end of said handle to act as a lock to prevent sliding movement of said chain from said first-named end of said handle.

* * * * *